(12) United States Patent
Liebert

(10) Patent No.: US 6,901,954 B2
(45) Date of Patent: Jun. 7, 2005

(54) SAFETY RELIEF VALVE

(76) Inventor: Jeffrey W. Liebert, 9303 Cedar La., New Salisbury, IN (US) 47161

(*) Notice: Subject to any disclaimer, the term of this patent is extended or adjusted under 35 U.S.C. 154(b) by 145 days.

(21) Appl. No.: 10/383,024

(22) Filed: Mar. 6, 2003

(65) Prior Publication Data

US 2003/0168104 A1 Sep. 11, 2003

Related U.S. Application Data

(60) Provisional application No. 60/362,952, filed on Mar. 7, 2002.

(51) Int. Cl.[7] .............................................. F16K 15/03
(52) U.S. Cl. .................. 137/527.4; 137/527; 137/527.6
(58) Field of Search .............................. 137/527, 527.4, 137/527.6, 527.8

(56) References Cited

U.S. PATENT DOCUMENTS

| | | | | |
|---|---|---|---|---|
| 1,682,039 A | * | 8/1928 | Feagles | 137/527 |
| 1,725,428 A | | 8/1929 | Tilden | |
| 2,282,532 A | * | 5/1942 | Shenk | 137/527.4 |
| 2,827,921 A | * | 3/1958 | Sherman et al. | 137/527 |
| 3,040,772 A | | 6/1962 | Todd | |
| 3,060,962 A | | 10/1962 | Graves | |
| 3,074,429 A | | 1/1963 | Farrow | |
| 3,358,709 A | * | 12/1967 | Thresher et al. | 137/527.4 |
| 3,509,908 A | * | 5/1970 | Latham et al. | 137/527 |
| 3,616,814 A | * | 11/1971 | Hendey | 137/527.8 |
| 3,710,813 A | | 1/1973 | Hodgman, Jr. | |
| 3,897,804 A | * | 8/1975 | Buck et al. | 137/527.8 |
| 5,158,104 A | | 10/1992 | Wilkins | |
| 5,205,311 A | | 4/1993 | Wilkins | |
| 5,584,315 A | * | 12/1996 | Powell | 137/527 |
| 5,855,224 A | | 1/1999 | Lin et al. | |
| 6,050,293 A | | 4/2000 | Lin et al. | |
| 6,085,781 A | | 7/2000 | Boutry | |

* cited by examiner

Primary Examiner—John Rivell
(74) Attorney, Agent, or Firm—Woodard, Emhardt, Moriarty, McNett & Henry LLP

(57) ABSTRACT

A safety relief valve is provided for use in association with a liquid storage tank. The safety relief valve generally includes a valve base, a valve seal plate, a hinge mechanism and a lever mechanism. The valve seal plate is pivotally coupled to the valve base by the hinge mechanism which is adapted to allow pivotal movement of the valve seal plate between a closed position and an open position. The lever mechanism is pivotally coupled to the valve base and is adapted to control the pivotal movement of the valve seal plate. In one embodiment, the hinge mechanism includes an adjustment device adapted to adjust the valve opening set point. In another embodiment, the lever mechanism includes a rod pivotally coupled to the valve base and a guide rotatably coupled to the valve seal plate, with the rod being displaceable through the guide during pivotal displacement of the valve seal plate.

24 Claims, 11 Drawing Sheets

SAFETY RELIEF VALVE

CROSS REFERENCE TO RELATED APPLICATIONS

The present application claims the benefit of Provisional Application Ser. No. 60/362,952 filed on Mar. 7, 2002, the contents of which are hereby incorporated by reference in their entirety.

FIELD OF THE INVENTION

The present invention relates generally to valves used in association with liquid storage tanks, and more particularly relates to a safety relief valve used in association with a liquid storage tank on a marine vessel, such as a barge, to enable an amount of the contents in the tank to be discharged to release excessive pressure within the tank, particularly during a tank filling operation.

BACKGROUND OF THE INVENTION

A commonly used approach to control internal pressure within storage tanks is to employ a valve having a valve seal plate that is slidably mounted on a stationary guide post. This approach relies on sliding engagement between the seal plate and the guide post to guide the seal plate during opening and closing of the valve. Several problems are encountered with such an arrangement. For example, it is difficult to correctly establish the internal tank pressure at which the valve will open (e.g., the valve opening set point). Additionally, it is difficult to assure adequate discharge volume without attendant and excessive internal tank pressure build-up. Moreover, the seal plate may stick or become bound on the guide post during opening and closing of the valve.

Spring-operated valves are sometimes used to limit internal tank pressure. This approach relies on a compression force exerted by a spring onto the mid-portion of the seal plate to keep the valve sealed during normal pressurization of the tank. As the valve opens, the spring is compressed and exerts a closing force onto the seal plate which is higher than the initial valve opening set point. The more the valve opens, the greater the closing force exerted by the spring onto the seal plate. As a result, these types of spring-operated valves will never fully open to allow maximum flow through the valve unless internal tank pressures are exceedingly high. Additionally, these types of spring-operated valves will close whenever the internal tank pressure is reduced to a point approximately equal to the initial valve opening set point. Accordingly, spring-operated valves will repeatedly open to less than maximum flow and will tend to prematurely reseal or close, thereby creating waves of back pressure and resistance throughout the fluid transfer system.

Weight-operated valves have also been used to limit internal tank pressure. These types of valves rely on a relatively large weight positioned at the mid-portion of the seal plate to keep the valve sealed during normal pressurization of the tank. Since the location of the weight remains unchanged, the closing force exerted onto the seal plate will remain constant and the closing force exerted onto the seal plate will always be approximately equal to the initial valve opening set point. Similar to spring-operated valves, weight-operated valves will never fully open to allow maximum flow through the valve unless internal tank pressures are exceedingly high. Likewise, weight-operated valves will close whenever the internal tank pressure is reduced to a point approximately equal to the initial valve opening set point. Accordingly, weight-operated valves will repeatedly open to less than maximum flow and will tend to prematurely reseal or close, thereby creating waves of back pressure and resistance throughout the fluid transfer system.

Thus, there is a general need in the industry to provide an improved safety relief valve for use in association with a liquid storage tank. The present invention meets this need and provides other benefits and advantages in a novel and unobvious manner.

SUMMARY OF THE INVENTION

The present invention relates generally to a safety relief valve for use in association with a liquid storage tank. While the actual nature of the invention covered herein can only be determined with reference to the claims appended hereto, certain forms of the invention that are characteristic of the preferred embodiments disclosed herein are described briefly as follows.

In one form of the present invention, a safety relief valve is provided including a valve base, a valve seal plate pivotally coupled to the valve base by a hinge mechanism adapted to allow pivotal movement of the valve seal plate between a closed position and an open position, and a lever mechanism pivotally coupled to the valve base and adapted to control the pivotal movement of the valve seal plate. In one embodiment, the hinge mechanism includes an adjustment device adapted to adjust the valve opening set point. In another embodiment, the lever mechanism includes a rod pivotally coupled to the valve base and a guide rotatably coupled to the valve seal plate, with the rod being displaceable through the guide during pivotal displacement of the valve seal plate.

It is one object of the present invention to provide an improved safety relief valve for use in association with a liquid storage tank.

Further objects, features, advantages, benefits, and aspects of the present invention will become apparent from the drawings and description contained herein.

DESCRIPTION OF THE ILLUSTRATED EMBODIMENTS

Figure 1:
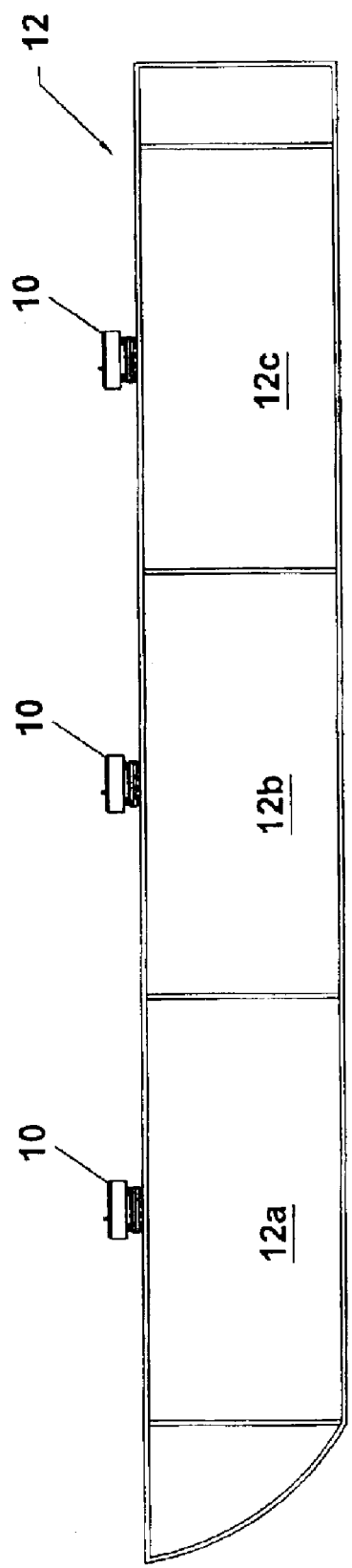
FIG. 1 is a side elevational view, partially in section, of a barge including a plurality of safety relief valve assemblies according to one embodiment of the present invention, as mounted to the top of the barge and disposed in communication with individual liquid storage tanks.

For the purposes of promoting an understanding of the principles of the invention, reference will now be made to the embodiments illustrated in the drawings and specific language will be used to describe the same. It should nevertheless be understood that no limitation of the scope of the invention is hereby intended, and that any alterations and further modifications in the illustrated embodiments, and any further applications of the principles of the invention as illustrated herein are contemplated as would normally occur to one skilled in the art to which the invention relates.

Referring to FIG. 1, shown therein are a number of safety relief valve assemblies 10 according to one embodiment of the present invention. The safety relief valve assemblies 10 are mounted to the top of a barge 12, with each of the safety relief valve assemblies 10 disposed in communication with a respective barge storage tank or compartment 12a, 12b, 12c. In one embodiment of the invention, the storage tanks 12a, 12b, 12c are liquid cargo holding tanks such as may be used to contain fluids such as oil, petroleum, chemicals, or other types of fluids that would occur to one of skill in the art. Although the safety relief valve assembly 10 has been illustrated and described as being used in association with storage tanks on a barge, it should be understood that the safety relief valve assembly 10 may be used in conjunction with other types of storage tanks, including stationary or earth-mounted storage tanks. Additionally, although the safety relief valve assembly 10 has been illustrated and described as being used in association with tanks for containing liquids, it should be understood that the safety relief valve assembly 10 may be used in association with tanks for containing gases or solid materials.

Figure 2:
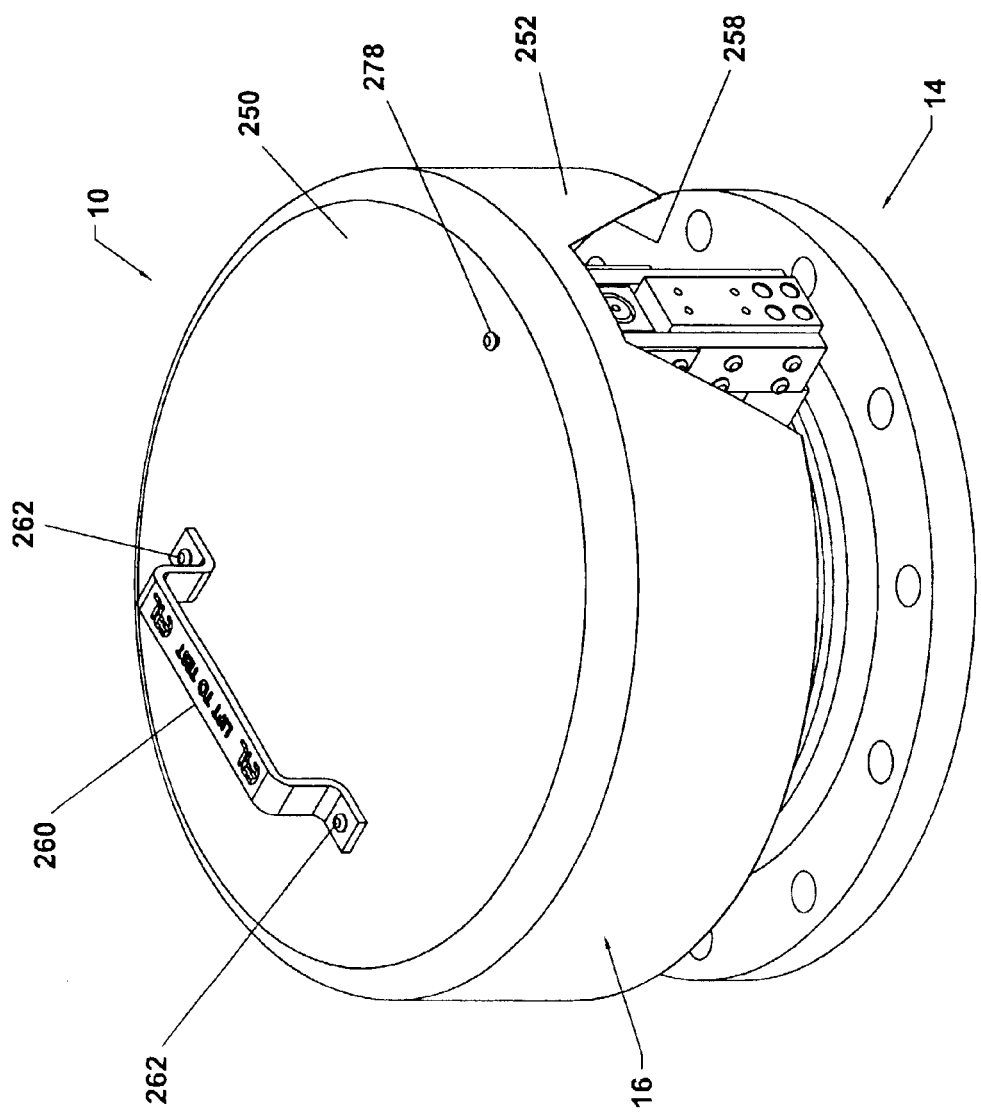
FIG. 2 is a side perspective view of one of the safety relief valve assemblies depicted in FIG. 1.
Figure 3:
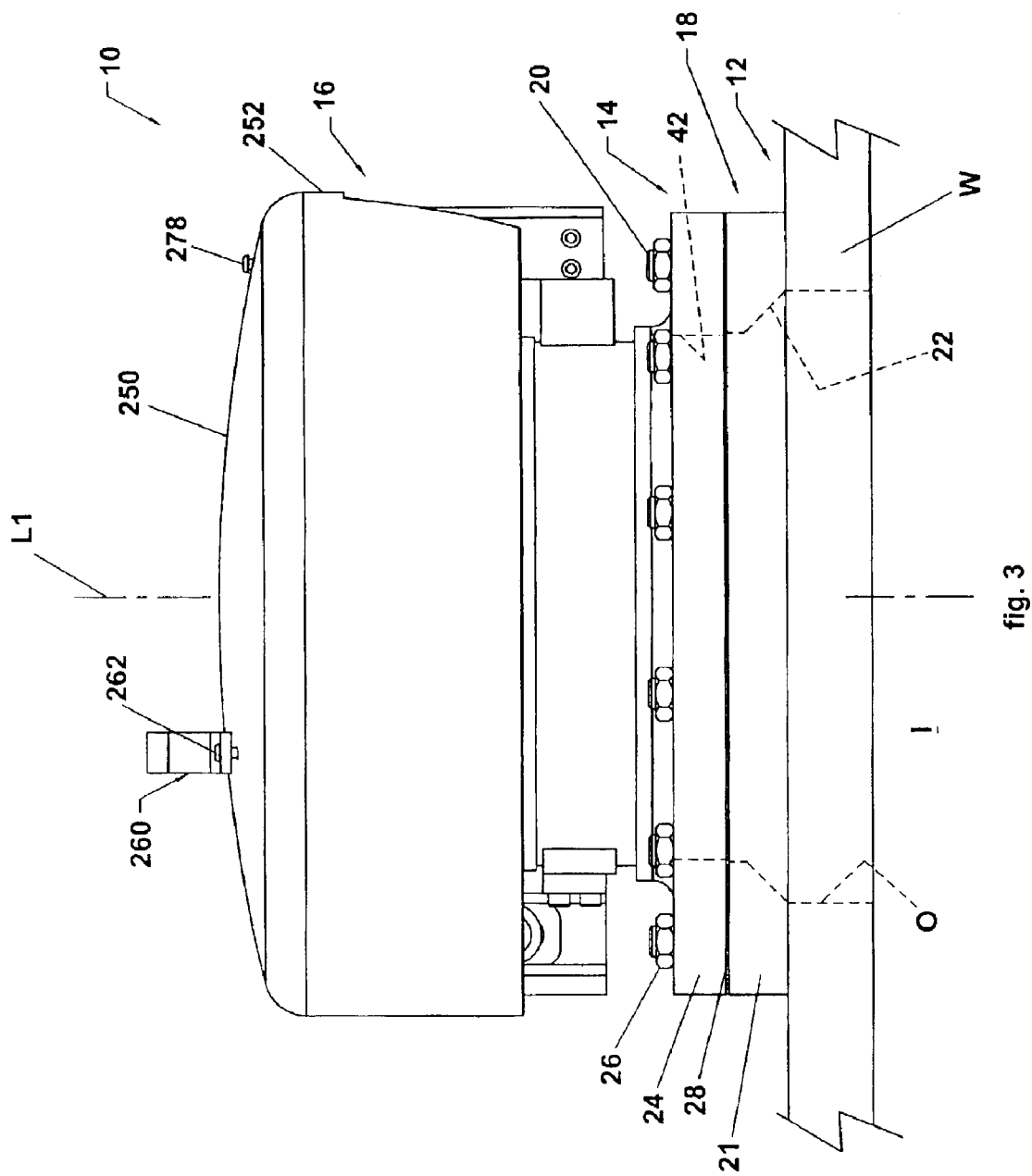
FIG. 3 is a side elevational view of the safety relief valve assembly depicted in FIG. 2.

Referring to FIGS. 2 and 3, shown therein are further details regarding the safety relief valve assembly 10. The safety relief valve assembly 10 is generally comprised of a safety relief valve 14 and a protective hood or cover 16. The structural components of the safety relief valve assembly 10 are preferably formed of a corrosion resistant material, such as, for example, stainless steel. Other materials may also be used, such as, for example, aluminum, plastic, or any other material that would occur to one of skill in the art. Further details regarding the protective hood 16 will be discussed below. The safety relief valve 14 is preferably mounted to a top tank wall W of the barge 12 via a mounting flange 18 extending about the perimeter of a generally circular cutout opening O formed through the tank wall W. The mounting flange 18 includes a number of threaded studs 20 extending from an annular flange portion 21 with an axial passage 22 extending therethrough. The annular flange portion 21 is securely attached to the tank wall W, such as, for example, by welding, with the axial passage 22 communicating with the interior I of the storage tank via the cutout opening O.

The safety relief valve 14 also includes an annular flange portion 24 that is secured to the annular flange portion 21 of the mounting flange 18. The annular flange portion 24 includes a number of openings (FIG. 2) which receive the threaded studs 20 therethrough. A number of nuts 26 are threaded onto the studs 20 to secure the safety relief valve 14 to the mounting flange 18. A seal or gasket 28 is preferably disposed between the annular flange portions 21, 24 to provide a vapor-tight seal therebetween. The seal 28 may be formed of Viton, EPDM, or any other suitable gasket material. Although a specific embodiment for mounting the safety relief valve 10 to the top wall W of the barge 12 has been illustrated and described herein, it should be understood that other types of mounting configurations are also contemplated as would occur to one of skill in the art.

Referring to FIGS. 4–7, shown therein are further details regarding the safety relief valve 14. The safety relief valve 14 extends generally along a longitudinal axis $L_1$ and is generally comprised of a valve base 30, a valve seal plate 32, a hinge mechanism 34, and a lever mechanism 36. The valve seal plate 32 is pivotally connected to the valve base 30 by the hinge mechanism 34 to allow valve seal plate 32 to pivot between open and closed configurations about a pivot axis $P_1$. The lever mechanism 36 serves to control the opening and closing of the safety relief valve 14, the details of which will be discussed below.

Figure 7:
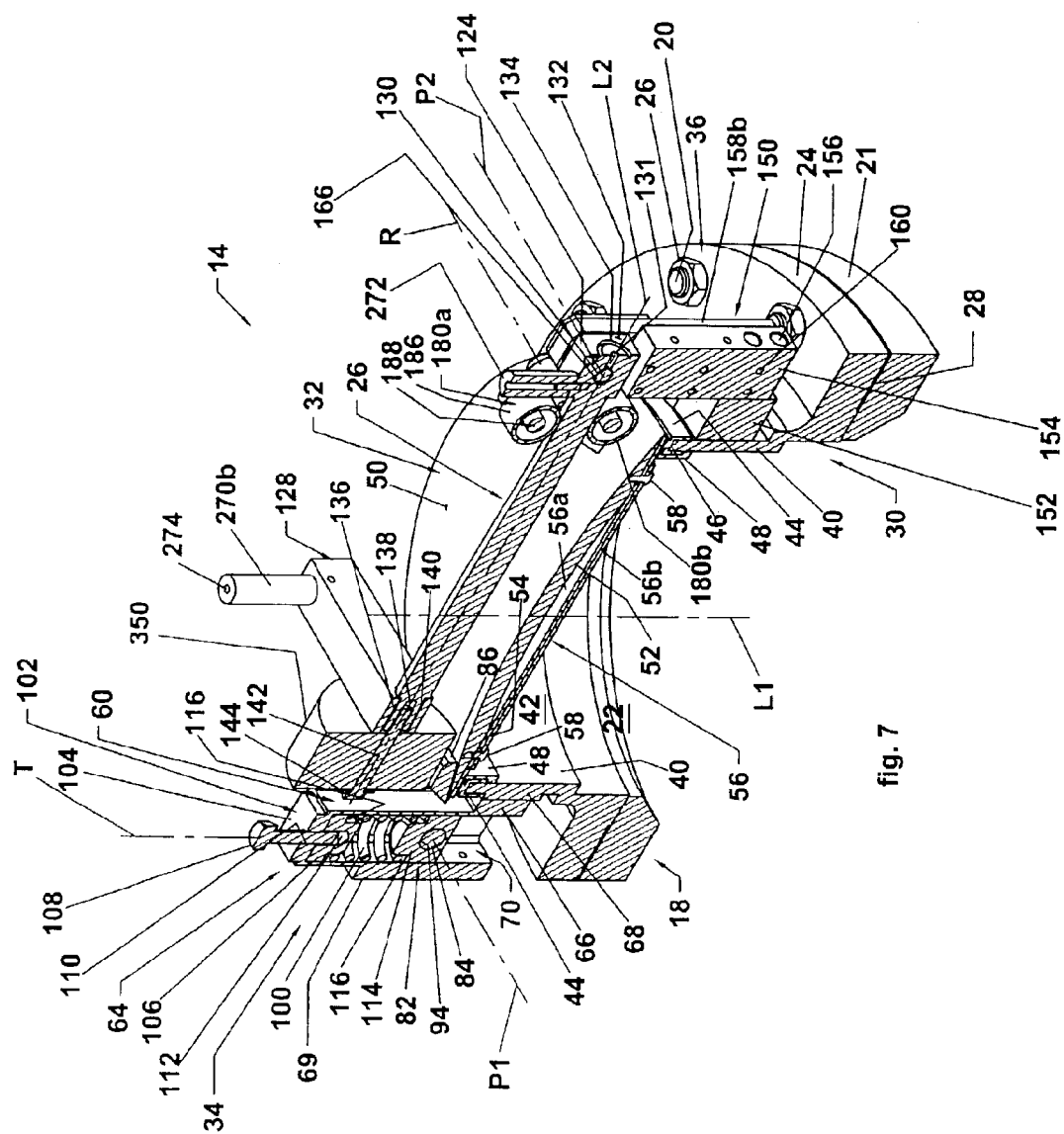
FIG. 7 is a cross-sectional side perspective view of the safety relief valve depicted in FIG. 4, taken along line 7—7 of FIG. 6.

The valve base 30 is generally comprised of the above-discussed annular mounting flange 24 and a cylindrical-shaped seal flange 40 extending axially from the mounting flange 24. The valve base 30 defines an axial passage 42 (FIG. 7) extending through the mounting flange 24 and the seal flange 40. As shown in FIG. 7, the axial passage 42 is positioned in communication with the axial passage 22 of the mounting flange; 18, and in turn the interior I of the storage tank. Although the valve base 30 has been illustrated and described as having a generally circular or cylindrical configuration, it should be understood that other shapes and configurations are also contemplated as falling within the scope of the present invention, such as, for example, a square or rectangular configuration.

A seal gasket 44 is preferably positioned about an outwardly-facing peripheral edge 46 (FIG. 7) of the seal flange 40 to provide a vapor-tight seal between valve seal plate 32 and the seal flange 40 when the safety relief valve 14 is closed. The seal gasket 44 may be formed of Viton, EPDM, or any other suitable gasket material. In one embodiment of the invention, the seal gasket 44 has a U-shape configuration adapted to slip over the distal end of the seal flange 40. A gasket retainer 48 is preferably attached to the inner surface of the seal flange 40 to hold the seal gasket 44 in position.

The valve seal plate 32 has a size and shape that preferably corresponds to the size and shape of the valve base 30. In one embodiment of the invention, the valve seal plate 32 has a domed configuration which tends to strengthen the valve seal plate 32. In instances where a protective cover 16 is not used, the domed configuration also tends to prevent accumulation of foreign material on top of the valve seal plate 32 which might otherwise affect proper opening and closing of the safety relief valve 14. Such foreign material might include, for example, rain, snow, ice or debris.

The valve seal plate 32 includes a convex outer surface 50, a concave inner surface 52, and a generally flat inner annular shoulder 54 extending about the perimeter of the concave inner surface 52. A disk-shaped diaphragm 56 comprised of an inner layer 56a and an outer layer 56b is secured to the annular shoulder 54 via a number of screws or fasteners 58. In one embodiment of the invention, the inner layer 56a is formed of a plastic material, such as, for example, Teflon® material, and the outer layer 56b is formed of a corrosion resistant metallic material, such as, for example, stainless steel. The outer peripheral portion of the inner layer 56a is placed in engagement against the gasket 44 when the safety relief valve 14 is closed to provide a vapor-tight sealing arrangement. Notably, since the inner layer 56a is formed of a Teflon® material, the tendency for the valve seal plate 32 to stick to the seal gasket 44 is reduced. This is particularly advantageous when dealing with certain types of corrosive or viscous materials. Although the valve seal plate 32 and the diaphragm 56 have been illustrated and described as having a particular shape and configuration, it should be understood that other shapes and configurations are also contemplated as would occur to one of skill in the art.

The hinge mechanism 34 is generally comprised of an outer housing 60, a pivot device 62, and a bias device 64. The outer housing 60 is securely affixed to the seal flange 40 of valve base 30. The pivot device 62 pivotally connects the valve seal plate 32 to the housing 60 to provide pivotal movement of the valve seal plate 32 relative to the valve base 30 about a pivot axis $P_1$. The pivot device 62 is also displaceable relative to the outer housing 60 generally along a translation axis T. The bias device 64 exerts a downward biasing force against the pivot device 62 generally along the translation axis T to compress the valve seal plate 32 in sealing engagement against the gasket 44 and to initially maintain the safety relief valve 14 in a closed position. Notably, the downward biasing force exerted by the bias device 64 is offset from the valve seal plate 32, the function of which will be discussed below.

The outer housing 60 is coupled to the seal flange 40 by way of a mounting block 66. In one embodiment of the invention, the housing 60 is welded to the mounting block 66, which is in turn welded to a mounting bracket 68 affixed to the outer surface of the seal flange 40 by a plurality of screws or fasteners 67. It should be understood, however, that other methods of attaching the housing 60 to the seal flange 40 are also contemplated as would occur to one of skill in the art. A support plate 69 is attached to the side of the housing 60 opposite the mounting bracket 66 to provide additional structural support and rigidity to the housing 60. The housing 60 has a hollow interior defining an inner passageway 70 (FIGS. 7). The housing 60 also defines a pair of aligned, slotted openings 72 (FIG. 8) extending through opposite side walls 74a, 74b of the housing 60. Although the housing 60 is depicted as having a substantially square cross section, it should be understood that the housing 60 may take on other shapes and configurations, such as, for example, a generally circular configuration.

The pivot device 62 is generally comprised of a pivot arm 80, a slide block 82, and a hinge pin 84. The pivot arm 80 is securely affixed to the valve seal plate 32 and is pivotally connected to the slide block 82 via the hinge pin 84. The slide block 82 is positioned within the inner passageway 70 of the housing 60. In a preferred embodiment of the invention, the outer cross section of the slide block 82 is sized and shaped in close tolerance with the inner cross section of the passageway 70 so as to allow the side walls of the housing 60 to support the slide block 82 while permitting the slide block 82 to be freely displaced through the passageway 70 along the translation axis T. However, it should be understood that the outer cross section of the slide block 82 need not necessarily be the same as the inner cross section of passageway 70. For example, the slide block 82 may take on a circular cross section while the passageway 70 may take on a square cross section.

The pivot arm 80 includes a base portion 86 and a pair of opposing fingers 88a, 88b extending therefrom to define a yoke. Each of the fingers 88a, 88b defines an aperture (not shown) sized to receive a fastener 90 therethrough which in turn engages the hinge pin 84. The base portion 86 is securely affixed to the outer surface 50 of the valve seal plate 32, such as, for example, by welding or fastening. The housing 60 is received within the yoke defined by the opposing fingers 88a, 88b. A rectangular washer 92a, 92b is preferably disposed between the fingers 86a, 86b of pivot arm 80 and the side walls 74, 74b of housing 60, respectively. Each of the washers 92a, 92b defines a slotted opening (not shown) aligned with the slotted opening 72 defined through the housing side walls 74a, 74b. In one embodiment of the invention, the washers 92a, 92b are securely affixed to the outer surface of the housing 60, such as, for example, by welding.

The slide block 82 defines an opening 94 extending therethrough and sized to receive the hinge pin 84 therein (FIG. 7). The hinge pin 84 passes through the slotted openings 72 in the housing side walls 74a, 74b and is also disposed within the slotted openings in the washers 92a, 92b. The hinge pin 84 is coupled to the pivot arm 80 by the fasteners 90 extending through the openings in the fingers 88a, 88b. As a result, the pivot arm 80 is pivotally connected to the slide block 82 and is allowed to freely pivot about the pivot axis $P_1$ (defined along the hinge pin 84). Additionally, the slide block 82 is allowed to translate along the inner passageway 70 of the housing 60 along the translation axis T. As should be appreciated, as the slide block 82 is displaced along the inner passageway 70, the hinge pin 84 is correspondingly displaced through the slotted openings 72 in the housing 60 and the slotted openings in the washers 92a, 92b. As should also be appreciated, the range of travel of the slide block 82 along the inner passageway 70 is limited by the length of the slotted openings 72.

The bias device 64 is generally comprised of a spring 100 and a spring tension adjusting mechanism 102 (FIG. 7). The spring 100 is preferably a coil spring. However, it should be understood that other types and configurations of springs may also be used. It should also be understood that other types and configurations of-biasing devices may be used in place of the spring 100 as would occur to one of skill in the art. The tension adjusting mechanism 102 includes a stationary top plate 104, a movable bottom plate 106, and a threaded fastener 108 extending between the top and bottom plates 104, 106. The stationary top plate 104 is securely affixed to the top of the housing 60, such as, for example, by welding. The movable bottom plate 106 is positioned within the inner passageway 70 of the housing 60. In a preferred embodiment of the invention, the movable. bottom plate 106 is sized and shaped to allow the side walls of the housing 60 to guidably support the plate 106 generally along the translation axis T. The threaded fastener 108 is engaged within a threaded opening 110 extending through the stationary top plate 104. The distal end of the fastener 108 is rotatably disposed within an opening 112 extending partially through the movable bottom plate 106. As should be apparent, as the fastener 108 is threaded through the threaded opening 110 in the top plate 104, the bottom plate 106 will be correspondingly displaced through the passageway 70 of housing 60.

The spring 100 is disposed between the slide block 82 and the movable bottom plate 106 such as to exert a downward biasing force onto the slide block 82. In a preferred embodiment of the invention, the slide block 82 and the movable bottom plate 106 each include a spring retainer 114 that serve to maintain the spring 100 in the proper position and orientation. In one embodiment of the invention, the spring retainers 114 are comprised of circular projections extending from opposing surfaces of the movable bottom plate 106 and the slide block 82 so as to form shoulders 116. The circular projections 114 are disposed within the central opening extending through the spring 100, with the ends of the spring 100 abutting the opposing shoulders 116.

It should be appreciated that the spring 100 exerts a downward biasing force against the slide block 82, which in turn urges the valve seal plate 32 into engagement against the seal gasket 44 when the safety relief valve assembly 10 is in a closed position. It should further be appreciated that the tension in the spring 100 can be adjusted by rotating the threaded fastener 108 in a clockwise or counter-clockwise direction to correspondingly adjust the downward force exerted onto the valve seal plate 32. In this manner, the amount of force required to pivot the valve seal plate 32 toward an open position can be easily and conveniently adjusted. It should also be appreciated that the tension in the spring 100 at least partially determines the amount of internal tank pressure required to open the safety relief valve 14, the details of which will be discussed below. Therefore, by adjusting the tension in the spring 100, the set point at which the safety relief valve 14 will begin to open may be correspondingly adjusted.

The lever mechanism 36 is generally comprised of a lever element 120 pivotally coupled to the valve base 30 and a guide element 122 rotatably coupled to the valve seal plate 32. The lever 120 extends generally along a longitudinal axis $L_2$ and is permitted to pivot relative to the valve base 30 about a pivot axis $P_2$. The guide 122 is permitted to rotate relative to the valve seal plate 32 about a rotation axis R. In a preferred embodiment of the invention, the pivot axis $P_2$ and the rotation axis R are arranged generally parallel to one another. However, other orientations and arrangements of the pivot axis $P_2$ and the rotation axis R are also contemplated as falling within the scope of the present invention.

The lever 120 is comprised of a base portion 124, an elongate bar or lever arm portion 126 and a transverse cross member 128. The base portion 124 defines an opening 130 therethrough extending generally along the pivot axis $P_2$. The base portion 124 also defines a passage 131 extending from an outwardly facing surface 132 and intersecting the opening 130. An annular groove 134 is machined into the outer surface 132 encircling the passage 131. The lever arm portion 126 extends from the base portion 124 and is aligned generally along the longitudinal axis $L_2$. In one embodiment of the invention, the lever arm portion 126 has a generally circular cross section. However, it should be understood that other shapes and configurations are also contemplated, such as, for example, a square or rectangular configuration. The distal end portion 136 of the lever arm 126 defines a reduced outer cross section relative to the remainder of the lever arm 126. A threaded axial opening 138 is formed through the distal end portion 136. The distal end portion 136 is inserted within an axial opening 140 formed through the central portion of the transverse cross member 128. The transverse cross member 128 is connected to the lever arm 126 by a screw or fastener 142, with a washer 144 positioned about the screw 142. In one embodiment of the invention, the transverse cross member 128 has a generally square cross section. However, it should be understood that other shapes and configurations are also contemplated, such as, for example, a circular or rectangular configuration. A weight 350 may be attached to the transverse cross member 128 via the fastener 142, the purpose of which will be discussed below.

The lever 120 is pivotally coupled to the valve base 30 by a mounting structure 150 which allows the lever 120 to pivot relative to the valve base 30 about the pivot axis $P_2$. In one embodiment of the invention, the mounting structure 150 includes a mounting block 152 that is securely affixed to the seal flange 40, such as, for example, by welding. A central rail 154 is in turn connected to the mounting block 152, such as, for example, by a plurality of fasteners 156. A pair of side rails 158a, 158b are secured to opposite sides of central rail 154, such as, for example, by a plurality of fasteners 160. The upper end portion of each side rail 158a, 158b extends beyond the central rail 154 and defines an aperture 162 extending therethrough. The base portion 124 of the lever 120 is disposed between the upper end portions of side rails 158a, 158b. A hinge pin 166 is inserted through the apertures 162 in side rails 158a, 158b and through the opening 128 in the base portion 124 to pivotally connect the lever 120 to the side rails 158a, 158b to allow the lever 120 to freely pivot relative to the valve base 30 about the pivot axis $P_2$ (defined along the hinge pin 166). A pair of cover plates 170a, 170b are secured to the upper end portions of side rails 158a, 158b, such as, for example, by a plurality of fasteners 172, to retain the hinge pin 166 and any bearing assemblies that may be used in their proper position.

The guide 122 includes a pair of roller bearings 180a, 180b mounted in spaced relation relative to one another by a pair of oppositely disposed side plates 182a, 182b so as to define a guide track 184 therebetween. The roller bearings 180a, 180b are spaced apart a sufficient distance so that the lever arm 126 may be positioned within the guide track 184. Preferably, the width of the guide track 184 is sized in relatively close tolerance with the outer cross section of the lever arm 126. Each of the roller bearings 180a, 180b includes an outer roller 186 that is rotatably mounted to a bearing shaft 188, which is in turn disposed within aligned apertures defined by the side plates 182a, 182b. The bearing shaft 188 may be retained within the apertures in the side plates 182a, 182b by one or more set screws. In another embodiment of the invention, instead of using roller bearings, the guide 122 may alternative be comprised a pair of stationary tracks spaced apart to define the guide track 184. A pair of spaced apart mounting flanges 200a, 200b extend from the outer surface 50 of the valve seal plate 32 and are securely affixed thereto, such as, for example, by welding. The guide 122 is disposed between the mounting flanges 200a, 200b and is rotatably connected thereto by a first bearing assembly 202a extending between the mounting flange 200a and the guide side plate 182a, and a second bearing assembly 202b extending between the mounting flange 200b and the guide side plate 182b. The guide 122 is thereby permitted to freely rotate relative to the valve seal plate 32 about the rotation axis R.

Figure 8:
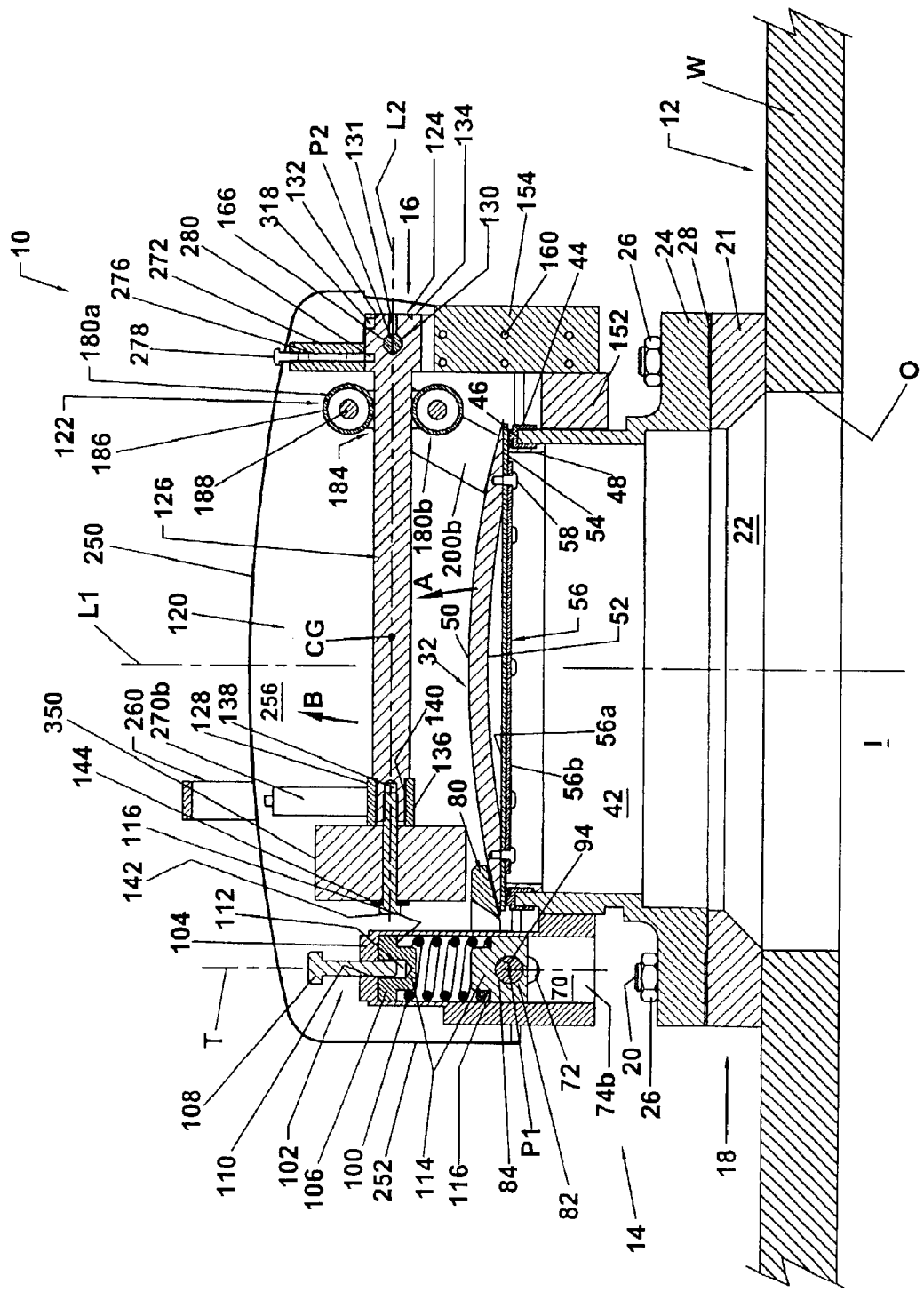
FIG. 8 is a side cross-sectional view of the safety relief valve assembly depicted in FIG. 3, as shown in a closed configuration.
Figure 9:
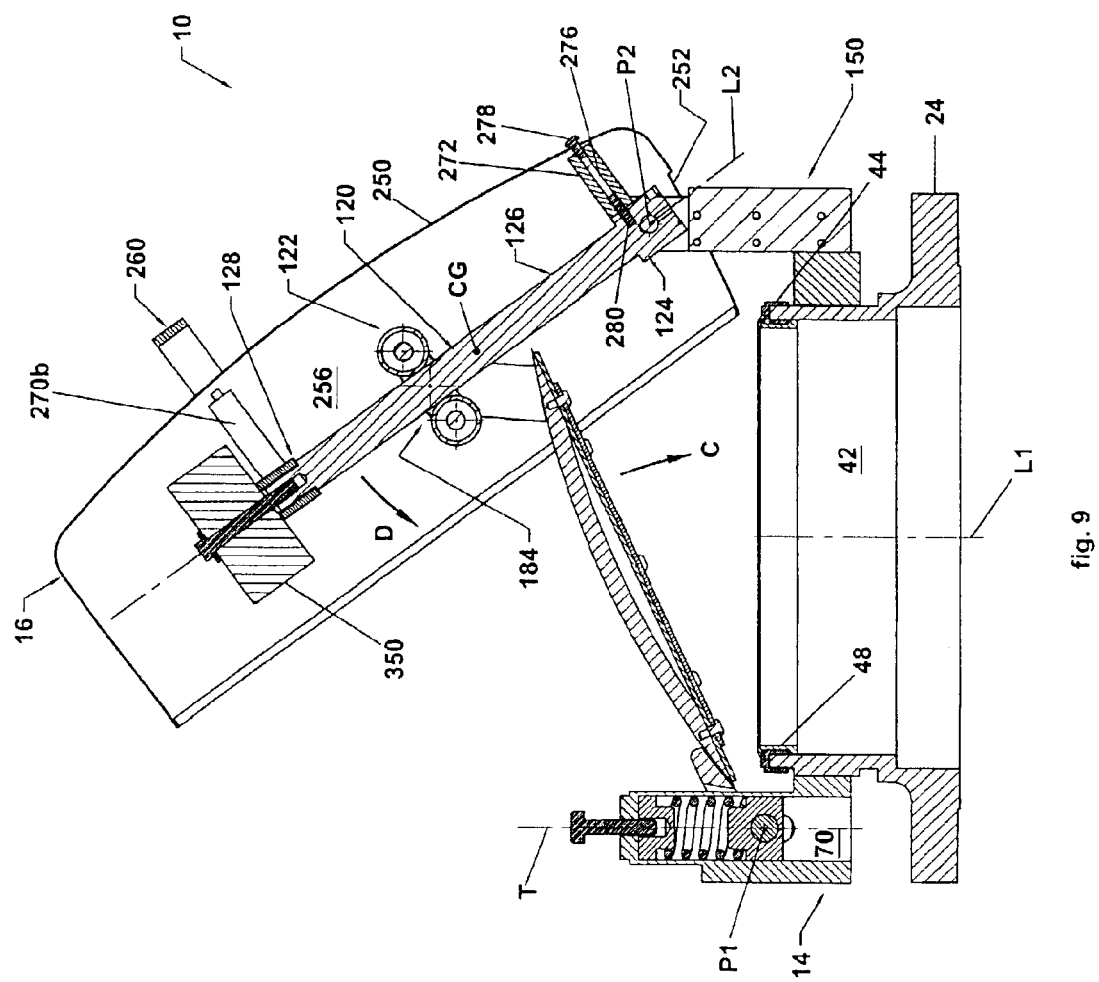
FIG. 9 is a side cross-sectional view of the safety relief valve assembly depicted in FIG. 3, as shown in an open configuration.

Referring to FIGS. 8 and 9, shown therein is the protective hood 16 attached to the safety relief valve 14. In one embodiment of the invention, the protective hood 16 has an inverted cup-like configuration, including a top wall 250 and an annular side wall 252. The top wall 250 and the side wall 252 cooperate to define a hollow interior 256 having a cross-section sufficiently large to receive the upper portion of the safety relief valve 14 therein. The top wall 250 preferably has a dome shape to minimize accumulation of material (e.g., water, snow, ice, debris, etc.) atop the protective hood 16. The annular side wall 252 defines a cut-out 258 (FIG. 2), the purpose of which will be discussed below. A handle 260 is attached to the top wall 250 by screws or fasteners 262. The handle 260 permits manual opening and closing of the safety relief valve assembly 10 to verify proper functioning of the safety relief valve 14 and to provide an efficient and convenient method of periodically inspecting the components of the safety relief valve 14, such as, for example, the seals and/or gaskets.

Figure 4:
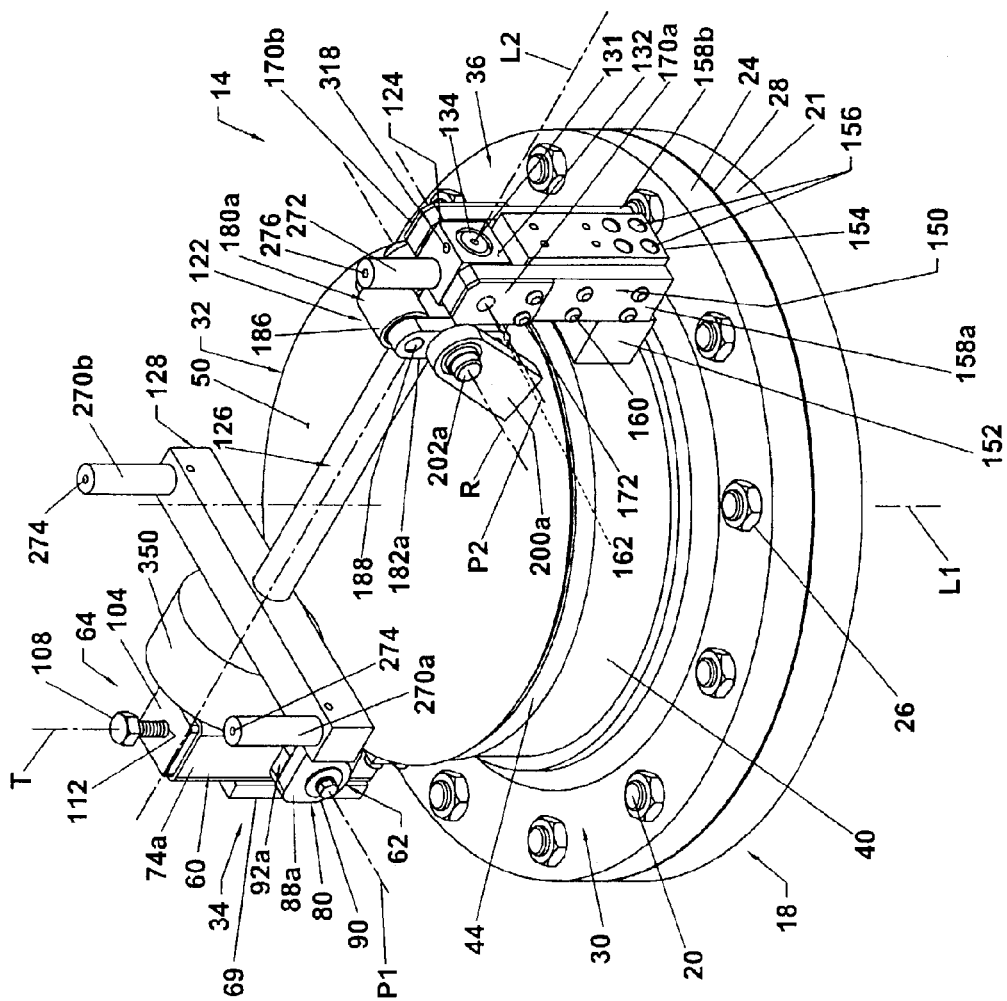
FIG. 4 is a side perspective view of a safety relief valve according to one embodiment of the present invention.
Figure 5:
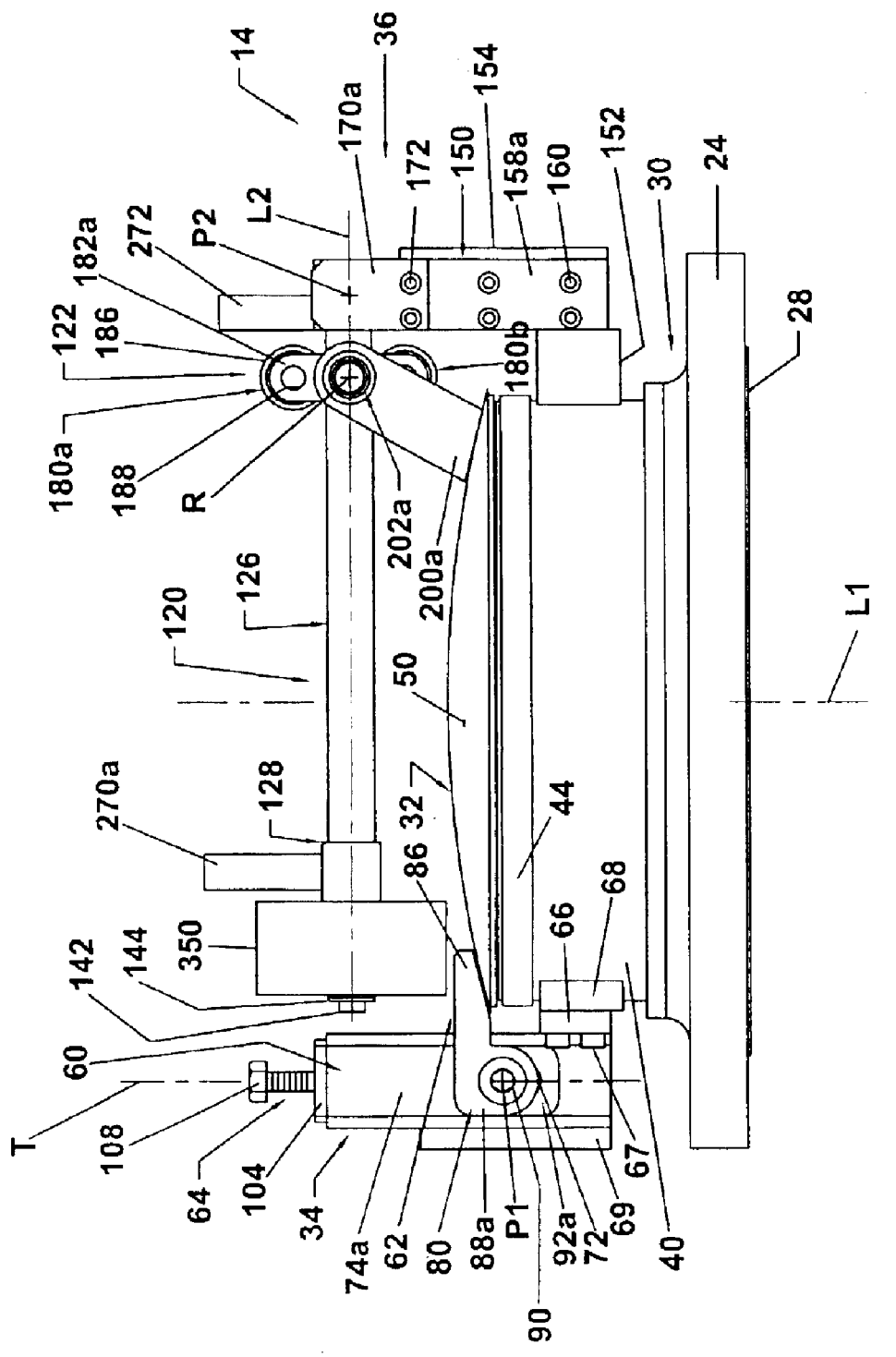
FIG. 5 is a side elevational view of the safety relief valve depicted in FIG. 4.
Figure 6:
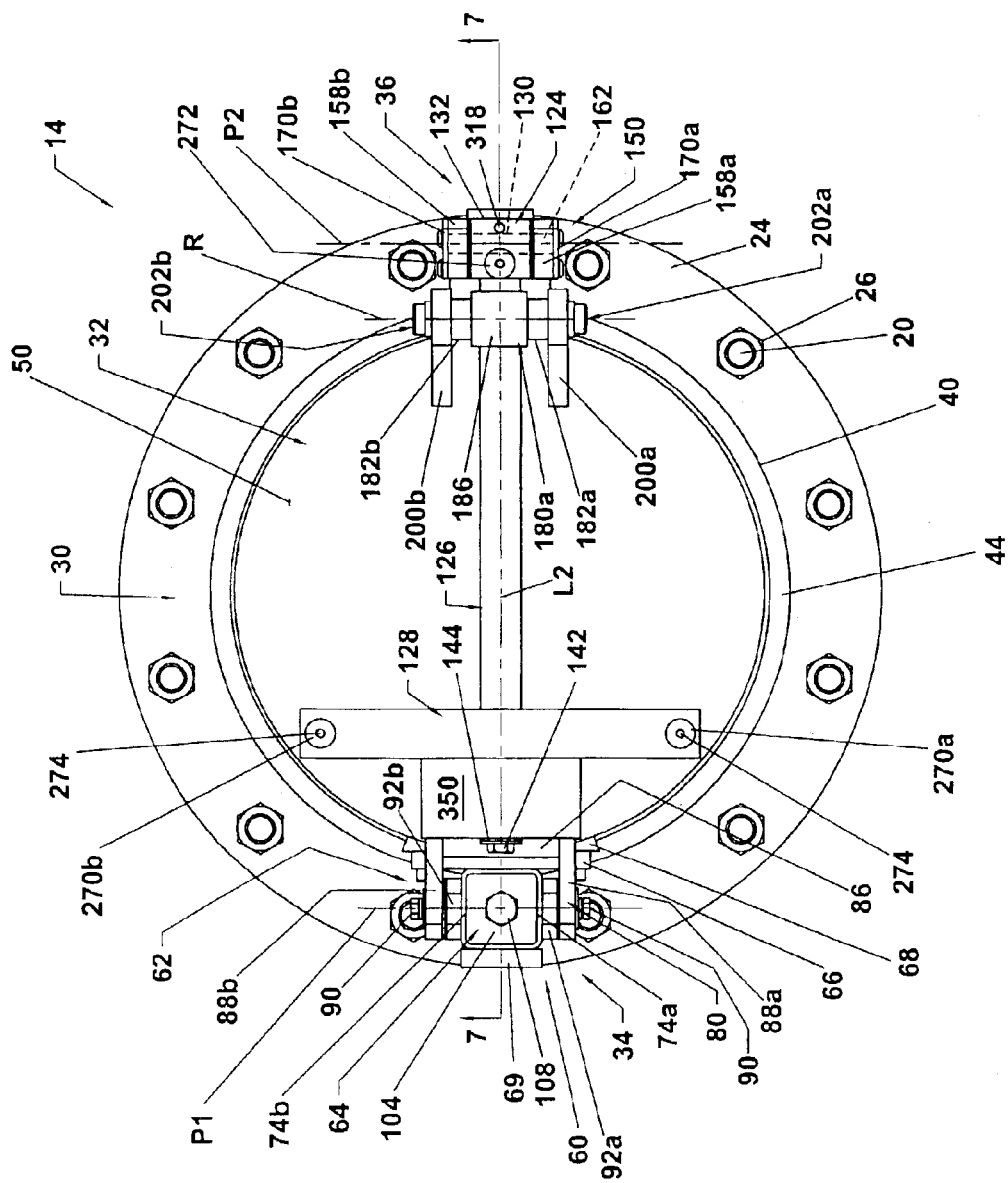
FIG. 6 is a top plan view of the safety relief valve depicted in FIG. 4.

The protective hood 16 is coupled to the lever 120 via a pair of cylindrical spacer members 270a, 270b extending from opposite ends of the transverse cross member 128, and a cylindrical spacer member 272 extending from the base portion 124 (FIG. 4). The cylindrical spacer members 270a, 270b each define an opening 274 extending therethrough. The screws 262 used to attach the handle 260 to the hood 16 extend through the respective openings 274 and are threaded into corresponding threaded openings (not shown) in the transverse cross member 128. The cylindrical spacer member 272 defines an opening 276 extending therethrough. A screw or fastener 278 extends through the opening 276 and is threaded into a corresponding threaded opening 280 in the base portion 124 of the lever 120. As shown in FIG. 9, the protective hood 16 rotates along with the lever 120 about the pivot axis $P_2$ during the opening and closing of the safety relief valve 14. The cut-out 258 (FIG. 2) in the side wall 252 is sized to receive the mounting structure 150 of the lever 120 therethrough when the safety relief valve assembly 10 is opened and closed to avoid interference between the protective hood 16 and the mounting structure 150.

Having described the various features associated with the safety relief valve assembly 10, reference will now be made to the operation of the safety relief valve assembly 10 according to one embodiment of the present invention. As illustrated in FIGS. 8 and 9, the safety relief valve assembly 10 is displaceable between a closed position and an open position, respectively. During normal pressurization of the liquid storage tank, the safety relief valve assembly 10 will remain in the closed position, with the valve seal plate 32 engaged tightly against the seal gasket 44 of the valve base 30 to maintain a vapor-tight seal. However, during certain conditions, the pressure within the interior I of the storage tank may increase beyond a predetermined critical level. If this predetermined pressure level is reached, the safety relief valve assembly 10 will open to allow a portion of the fluid contained in the storage tank to spill out. Opening of the safety relief valve assembly 10 thereby serves to prevent over-pressurization within the interior of the storage tank. Pressure build-up within the storage tank may be particularly apparent during a tank filling operation where internal tank pressure can rise significantly above atmospheric pressure if the storage tank is filled too rapidly or is filled beyond its capacity. Sudden increases in internal tank pressures are particularly a cause of concern in applications involving unvented storage tanks.

It should be appreciated that the forces that bias the safety relief valve assembly 10 toward the closed position illustrated in FIG. 8 are provided by the hinge mechanism 34 and the lever mechanism 36. Notably, the closing forces provided by the hinge mechanism 34 and the lever mechanism 36 are exerted onto opposite end portions of the valve seal plate 32, and are not exerted onto the central portion of the valve seal plate as in prior valve designs. When the safety relief valve assembly 10 in the closed position, approximately one-half of the valve closing force is provided by the hinge mechanism 34 via the downward force exerted by the spring 100 onto the slide block 82, which is transferred to the valve seal plate 32 via the hinge pin 84 and the pivot arm 80. Similarly, approximately one-half of the valve closing force is provided by the lever mechanism 36 via the downward force exerted by the lever 120 onto the guide 122, which is transferred to the valve seal plate 32 via the bearings 202a, 202b and the mounting flanges 200a, 200b.

As will be discussed in further detail below, the set point at which the safety relief valve assembly 10 will begin to open may be adjusted to correspond with the maximum acceptable pressure level within the interior I of the storage tank. This is accomplished by adjusting the closing force exerted onto the valve seal plate 32 by the hinge mechanism 34, by the lever mechanism 36, or by both the hinge mechanism 34 and the lever mechanism 36. In one embodiment of the invention, weight may be added to or removed from the lever 120 to increase/reduce the valve opening set point. As discussed above, the tension in the spring 100 of the hinge mechanism 34 may be increased/decreased to correspondingly increase/decrease the valve opening set point. Specifically, the tension in the spring 100 is adjusted via the spring tension adjusting mechanism 102 by threading the adjustment screw 108 into the threaded opening 112 in the stationary top plate 104. In one embodiment of the invention, the valve opening set point of the safety relief valve assembly 10 falls within a range of about 1 pound per square inch to about 3.5 pounds per square inch. However, it should be understood that other valve opening set points are also contemplated as falling within the scope of the present invention, including valve opening set points below 1 pound per square inch and above 3.5 pounds per square inch.

When the pressure within the interior I of the storage tank corresponds to the valve opening set point, the safety relief valve assembly 10 will begin to open. Specifically, when the valve opening set point is reached, the fluid pressure exerted against the diaphragm 56 of the valve seal plate 32 will cause the valve seal plate 32 to pivot about the pivot axis $P_1$ in the direction of arrow A. As the valve seal plate 32 is pivotally displaced toward the open position (FIG. 9), a portion of the fluid contained in storage tank is permitted to spill out to reduce the fluid pressure within the storage tank. Additionally, as the valve seal plate 32 is pivotally displaced toward the open position, the roller bearings 180a, 180b of the guide 122 will engage the lever arm 126 and will pivot the lever 120 about the pivot axis $P_2$ in the direction of arrow B. As the rod 126 is displaced through the guide track 184 between the roller bearings 180a, 180b, the guide 122 will simultaneously rotate about the rotation axis R.

It should be appreciated that shortly after the valve seal plate 32 begins to pivot open, the downward biasing force exerted by the spring 100 onto the slide block 82 will axially displace the slide block 82 along the inner passageway 70 of the housing 60. It should also be appreciated that displacement of the slide block 82 through the inner passageway 70 is limited by engagement of the hinge pin 84 against the ends of the slotted openings 72 defined by the housing side walls 74a, 74b and the washers 92a, 92b. Once the hinge pin 84 bottoms out on the lower end of the slotted openings 72, the position of the pivot axis $P_1$ is fixed and the biasing force exerted by the spring 100 will no longer have an effect on the opening or closing of the safety relief valve assembly 10.

As a result of the unique design and outboard positioning of the hinge mechanism 34, the closing force initially exerted by the hinge mechanism 34 onto the valve seal plate 32 when the safety relief valve assembly 10 is closed will be removed soon after the valve seal plate 32 begins to pivot open. It should also be appreciated that the downward displacement of the slide block 82 along the inner passageway 70 of the housing 60 will tend to exert an upward force onto the valve seal plate 32 as the pivot arm 80 is pivoted in an upward direction relative to the hinge pin 84. As a result, the hinge mechanism 34 actually aids in opening the safety relief valve assembly 10 soon after the valve seal plate 32 begins to pivot open. Therefore, the configuration of the hinge mechanism 34 not only aids in initially maintaining the safety relief valve assembly 10 in a closed position, but will also allow maximum flow through the safety relief valve assembly 10 soon after the valve seal plate begins to pivot open by eliminating the effects of the downward biasing force exerted by the spring 100.

The features and operation of the hinge mechanism 34 differ significantly from prior valve designs that utilize a spring to initially maintain the valve in a closed position. With these prior designs, the spring is positioned directly above the mid-portion of the valve seal plate so as to continuously bias the valve seal plate toward the closed position. Notably, as the valve opens, the spring is continually compressed and therefore exerts an ever-increasing closing force onto the valve seal plate that is significantly higher than the initial valve opening set point. As a result, these types of prior valve designs tend to restrict fluid flow and will never fully open to allow maximum flow through the valve unless internal tank pressures are exceedingly high.

As discussed above, when the valve seal plate 32 is pivotally displaced toward the open position in the direction of arrow A, the lever 120 will pivot about the pivot axis $P_2$ in the direction of arrow B and the lever arm 126 will be simultaneously displaced through the guide track 184 between the roller bearings 180a, 180b of the guide 122. It should be appreciated that the downward force exerted by the lever 120 onto the valve seal plate 32 (via the guide 122) will be at a maximum whenever the safety relief valve assembly 10 is in the closed position. As shown in FIG. 8, when the safety relief valve assembly 10 is in the closed position, the lever 120 will be disposed in a substantially horizontal orientation, with the center of gravity CG positioned well to the left of the area of engagement between the rod 126 and the roller bearings 180a, 180b. However, as the safety relief valve assembly 10 begins to open and the lever 120 starts to pivot in the direction of arrow B, the downward force exerted by the lever 120 onto the valve seal plate 32 will be gradually reduced. As shown in FIG. 9, when the safety relief valve assembly 10 is opened, the lever 120 will be disposed in an angular or non-horizontal orientation, thereby shifting the center of gravity CG to the right toward the pivot axis $P_2$ and potentially beyond the area of engagement between the rod 126 and the roller bearings 180a, 180b. This gradual shifting of the center of gravity CG in combination with a reduction in leverage associated with the lever 120 (i.e., a shorter torque arm distance) gradually reduces the downward closing force exerted onto the valve seal plate 32 as the valve seal plate 32 is pivoted in the direction of arrow A. In this manner, the lever 120 provides variable resistance to the opening of the safety relief valve assembly 10, with such resistance gradually decreasing as the safety relief valve assembly 10 continues to open to thereby allow increased fluid flow through the valve.

It should now be apparent that the hinge mechanism 32 and the lever mechanism 34 cooperate with the valve seal plate 32 to initially bias the valve seal plate 32 tightly against the seal gasket 44 of the valve base 30 to maintain a vapor-tight seal therebetween. However, when the pressure within the interior I of the storage tank increases beyond the valve opening set point of the safety relief valve assembly 10, the safety relief valve assembly 10 will open to allow a portion of the fluid contained in the storage tank to spill out. Since the downward biasing forces exerted by the hinge mechanism 32 and the lever mechanism 34 onto the valve seal plate 32 are gradually reduced and/or entirely removed as the valve seal plate 32 is pivoted open, fluid flow through the valve is maximized. As discussed above, the closing force exerted by the hinge mechanism 32 onto the valve seal plate 32 is entirely removed just after the valve seal plate 32 is pivoted open. As also discussed above, the closing force exerted by the lever mechanism 34 onto the valve seal plate 32 is gradually and continually reduced as the valve seal plate 32 is pivoted open. As a result, the safety relief valve assembly 10 will remain open even at fluid pressures well below the initial valve opening set point, thereby allowing the safety relief valve assembly 10 to remain open until fluid flow through the valve is virtually non-existent.

As the fluid pressure within the storage tank is reduced and fluid flow through the safety relief valve assembly 10 is decreased, the safety relief valve assembly 10 will begin to close. As shown in FIG. 9, the valve seal plate 32 will begin to pivot about the pivot axis $P_1$ in the direction of arrow C toward the valve base 30. As the valve seal plate 32 is pivotally displaced toward the closed position (FIG. 8), the roller bearings 180a, 180b of the guide 122 will engage the lever arm 126 and will cause the lever 120 to pivot about the pivot axis $P_2$ in the direction of arrow D. As the lever arm 126 is displaced through the guide track 184 between the roller bearings 180a, 180b, the guide 122 will simultaneously rotate about the rotation axis R. The valve seal plate 32 will continue to pivot toward the closed position until the valve seal plate 32 is engaged against the seal gasket 44. At this point, the downward biasing forces exerted by the hinge mechanism 32 and the lever mechanism 34 onto the valve seal plate 32 will once again be at their maximum level to ensure the formation of a vapor-tight seal between the valve seal plate 32 and the valve base 30.

Figure 10:
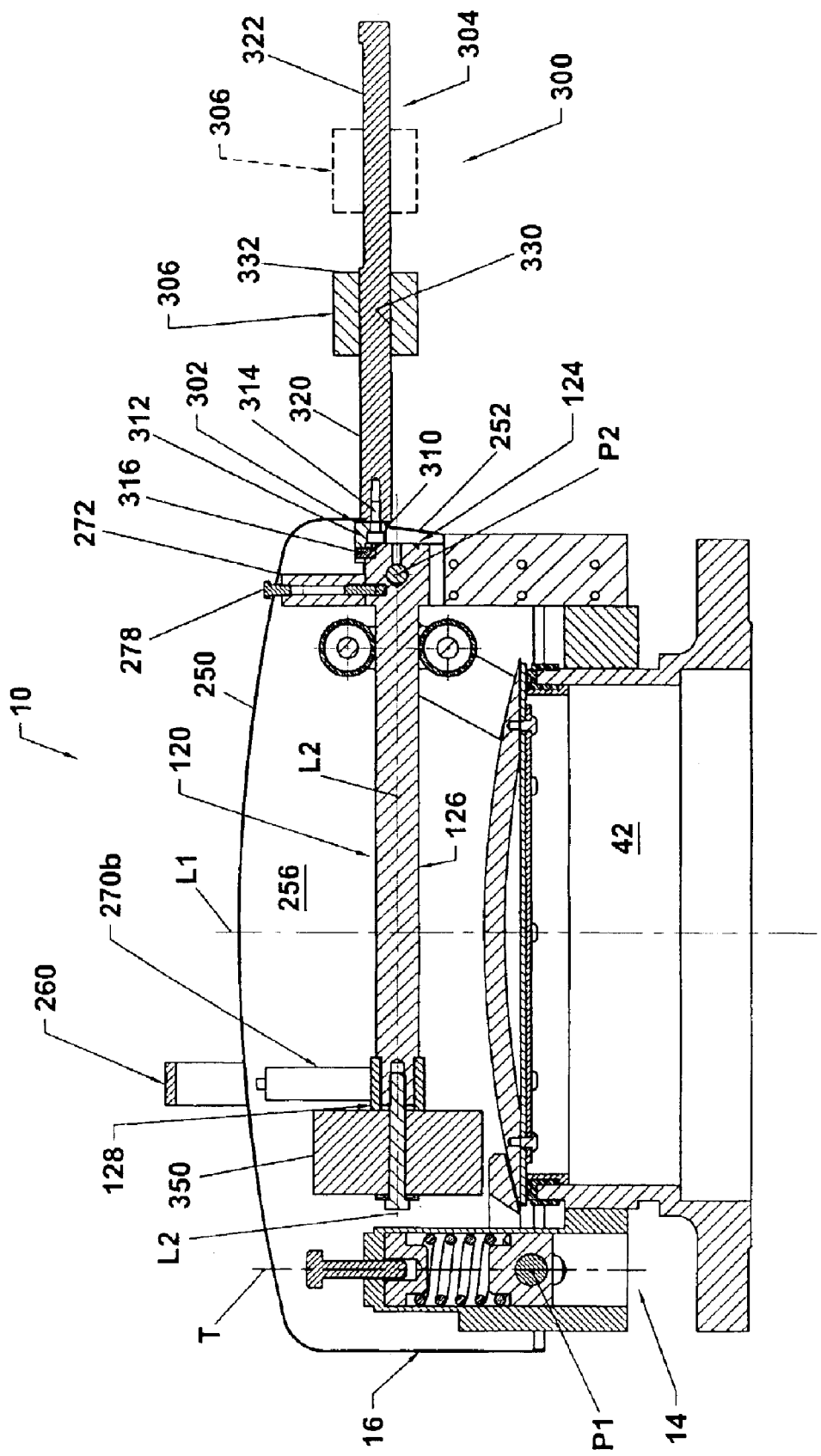
FIG. 10 is a side cross-sectional view of the safety relief valve assembly depicted in FIG. 3 with a test apparatus attached thereto according to one embodiment of the invention, as used to verify proper functioning of the safety relief valve assembly.

Referring to FIG. 10, shown therein is the safety relief valve assembly 10 with a test apparatus 300 removably attached thereto according to one embodiment of the invention. The test apparatus 300 is used to periodically verify the proper functioning of the safety relief valve assembly 10. More specifically, the test apparatus 300 is used to determine whether the safety relief valve assembly 10 will open at the appropriate internal tank pressure during an over pressurization condition. If necessary, the opening set point of the safety relief valve assembly 10 can be adjusted and the test apparatus 300 can once again be used to verify whether the appropriate valve opening set point has been attained. Once the desired valve opening set point has been reached, the test apparatus 300 can be removed from the safety relief valve assembly 10.

Figure 11:
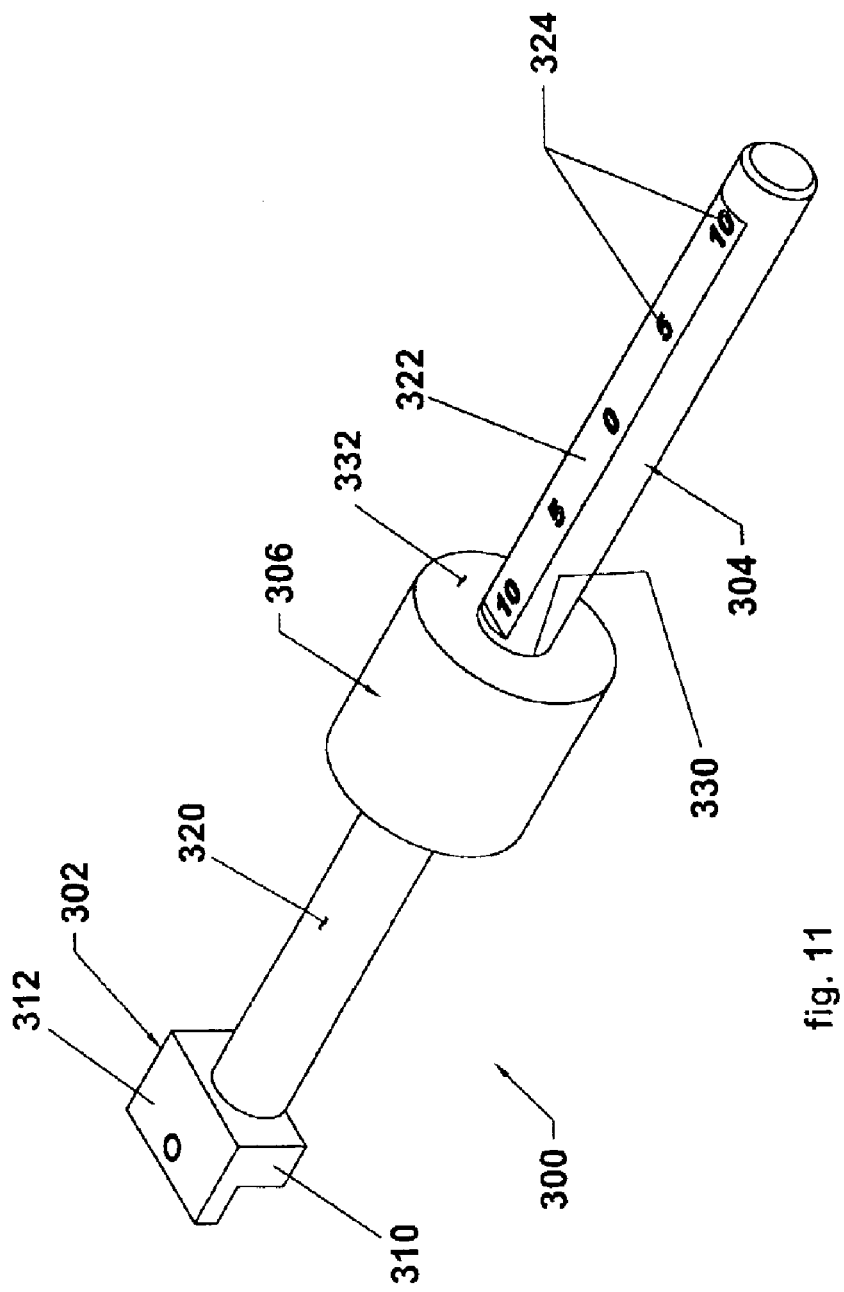
FIG. 11 is a side perspective view of the test apparatus depicted in FIG. 10.

Referring to FIG. 11, in one embodiment of the invention, the test apparatus 300 includes a mounting bracket 302, an elongate rod 304, and a test weight 306 that is adjustably positionable along the length of the elongate rod 304. The mounting bracket 302 is generally L-shaped, including a base portion 310 and a flange portion 312. The mounting bracket 302 is attached to the proximal end of the elongate rod 304 by a screw or fastener 314 (FIG. 10). The mounting bracket 302 is positioned in abutment against the upper corner portion of the base 124 of lever 120 and is releasably attached thereto by way of a pin or fastener 316 positionable within a corresponding opening 318 (FIG. 8) in the lever base 124. In one embodiment of the invention, the elongate rod 304 has a generally circular outer cross section defining a circular outer surface 320. The distal end portion of the elongate rod 304 includes a flattened portion 322 which includes a number of indicia markings 324. In one embodiment, the test weight 306 has a cylindrical configuration and defines an axial opening 330 extending therethrough that is sized to slidably receive the elongate rod 304 therein.

When testing of the safety relief valve assembly 10 is required, the test apparatus 300 is removably attached to the base 124 of lever 120 by the pin 316, with the elongate rod 304 extending through the cut-out 258 (FIG. 2) in the protective hood 16. As will be appreciated, the test apparatus 300 essentially acts as a counter-weight to the safety relief valve assembly 10. The test weight 306 is initially positioned at a location that will maintain the safety relief valve assembly 10 in the closed position illustrated in FIG. 10. When in this initial position, the end surface 332 of the test weight 306 is preferably positioned just short of the flattened portion 322 of the elongate rod 302.

If the safety relief valve assembly 10 begins to open with the test weight 306 in this initial position, the valve opening set point may be increased by adding weight to the lever 120. In one embodiment of the invention, one or more weights 350 (FIG. 10) may be attached to the transverse cross member 128 of the lever 120 to increase the valve opening set point and prevent the premature opening of the safety relief valve assembly 10. In one embodiment of the invention, the weight 350 is attached to the transverse cross member 128 by way of the fastener 142. However, it should be understood that the weights may be operatively attached to any portion of transverse cross member 128 or any other portion of the lever 120, including the lever arm 126. If one or more weights 350 are attached to the transverse cross member 128, the weight should preferably be placed symmetrical relative to the longitudinal axis $L_2$ to maintain proper balancing of the safety relief valve assembly 10. In one embodiment of the invention, the weight 350 has a cylindrical or disc-like shape; however, other types and configurations of weights are also contemplated. In lieu of or in combination with adding a weight 350 to the lever 120, the tension in the spring 100 of the hinge mechanism 34 may be increased to correspondingly increase the valve opening set point. As discussed above, the tension in spring 100 may be adjusted by threading the adjustment screw 108 into the threaded opening 112 in the stationary top plate 104.

If the safety relief valve assembly 10 remains closed with the test weight 306 in the initial position, the test weight 306 is slid along the elongate rod 304 toward the distal end of the elongate rod 304 until the safety relief valve assembly 10 begins to tip open. In one embodiment of the invention, the safety relief valve assembly 10 will begin to tip open when the end surface 332 of the test weight 306 is positioned adjacent the "0" indicia marking (i.e., the position shown in phantom). If the safety relief valve assembly 10 begins to open prior to the "0" position, the valve opening set point may be increased by adding weight to the lever 120 and/or by increasing the tension in the spring 100. If the safety relief valve assembly 10 begins to open when the test weight 306 is positioned beyond the "0" position, the valve opening set point may be decreased by reducing the amount of weight attached to the lever 120 and/or by decreasing the tension in the spring 100. In one embodiment of the invention, the indicia markings 324 on either side of the "0" position (i.e., "5", "10") are indicative of the percentage amount that the actual valve opening set point is above or below the optimum valve opening set point. Once the desired valve opening set point has been reached, the test apparatus 300 may be removed from the safety relief valve assembly 10. Further details regarding a test apparatus suitable for use with the present invention may be found in U.S. Pat. No. 5,205,311 to Wilkins, the contents of which are expressly incorporated herein in their entirety.

As discussed above, the safety relief valve assembly 10 of the present invention may be used in association with various types of liquid storage tanks including those commonly found on a marine vessel, such as, for example, a barge. In applications involving barges, an individual safety relief valve assembly 10 should preferably be used in conjunction with each storage tank or storage tank compartment. The safety relief valve assemblies 10 should preferably be positioned along the longitudinal centerline of the barge or just port or starboard of the longitudinal center line. If filling of the storage tanks is performed one tank at a time from stern-to-bow, the safety relief valve assemblies 10 should preferably be located toward the forward half of each storage tank or compartment. Conversely, if the filling operation is typically performed from bow-to-stern, the safety relief valve assembly 10 should preferably be located on the aft half of the storage tank. However, if the filling routine is likely to occur from both the bow and stern ends of the barge, the safety relief valve assembly 10 should preferably be located along the transverse center line of each storage tank.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A safety relief valve assembly, comprising:
    a valve base;
    a valve seal plate; and
    a hinge mechanism pivotally coupling said valve seal plate to said valve base to allow pivotal movement of said valve seal plate between a closed position and an open position, including:
        a first member secured to said valve base;
        a second member displaceable along said first member;
        a third member pivotally connected to said second member by a pivot pin and secured to said valve seal plate; and
        a biasing member engaging said second member and exerting a biasing force to urge said valve seal plate toward said closed position.

2. The safety relief valve assembly of claim 1, wherein said valve seal plate has a concave inner surface.

3. The safety relief valve assembly of claim 1, wherein said valve seal plate has a convex outer surface.

4. The safety relief valve assembly of claim 1, wherein said pivotal movement of said valve seal plate from said closed position to said open position occurs at a valve actuation pressure of between about 1 pound per square inch and about 3.5 pounds per square inch.

5. The safety relief valve assembly of claim 1, wherein said third member pivots relative to said second member about a first axis, said second member being displaceable relative to said first member along a second axis, said second axis being substantially perpendicular to said first axis.

6. A safety relief valve assembly, comprising:
    a valve base;
    a valve seal plate; and
    a hinge mechanism pivotally coupling said valve seal plate to said valve base to allow pivotal movement of said valve seal plate between a closed position and an open position, including:
        a first member secured to said valve base;
        a second member displaceable along said first member;
        a third member pivotally connected to said second member and secured to said valve seal plate;
        a biasing member engaging said second member and exerting a biasing force to urge said valve seal plate toward said closed position;

an elongate member pivotally coupled to said valve base;
a support member extending from said valve seal plate at a location generally opposite said hinge mechanism; and
wherein said elongate member engages said support member during said pivotal movement to urge said valve seal plate toward said closed position.

7. The safety relief valve assembly of claim 6, wherein said elongate member is pivotally coupled to said valve base and said support member is rotatably coupled to said valve seal plate.

8. The safety relief valve assembly of claim 7, wherein said third member of said hinge mechanism is secured to said valve seal plate adjacent a first side of said valve seal plate, said support member rotatably coupled to said valve seal plate adjacent a second side of said valve seal plate and positioned generally opposite said third member.

9. The safety relief valve assembly of claim 7, further comprising a weight attached to a distal end of said elongate member.

10. A safety relief valve assembly, comprising:
a valve base;
a valve seal plate; and
a hinge mechanism pivotally coupling said valve seal plate to said valve base to allow pivotal movement of said valve seal plate between a closed position and an open position, including:
a first member secured to said valve base;
a second member displaceable along said first member;
a third member pivotally connected to said second member and secured to said valve seal plate; and
a biasing member engaging said second member and exerting a biasing force to urge said valve seal plate toward said closed position;
an elongate member pivotally coupled to one of said valve base and said valve seal plate;
a guide rotatable coupled to the other of said valve base and said valve seal plate; and
wherein said elongate member engages said guide during said pivotal movement to aid in guiding said valve seal plate between said open and closed positions; and
wherein said guide comprises a pair of guide members spaced apart to define a guide track therebetween, said elongate member being received within said guide track to aid in guiding said valve seal plate between said open and closed positions.

11. The safety relief valve assembly of claim 10, wherein said guide members are rollers.

12. The safety relief valve assembly of claim 10, wherein said rollers are coupled between a pair of side plates, each of said side plates being rotatably connected to a respective flange extending from said valve seal plate.

13. A safety relief valve assembly, comprising:
a valve base;
a valve seal plate; and
a hinge mechanism pivotally coupling said valve seal plate to said valve base to allow pivotal movement of said valve seal plate between a closed position and an open position, including:
a first member secured to said valve base;
a second member displaceable along said first member;
a third member pivotally connected to said second member and secured to said valve seal plate; and
a biasing member engaging said second member and exerting a biasing force to urge said valve seal plate toward said closed position, said biasing force being adjustable.

14. A safety relief valve assembly, comprising:
a valve base;
a valve seal plate; and
a hinge mechanism pivotally coupling said valve seal plate to said valve base to allow pivotal movement of said valve seal plate between a closed position and an open position, including:
a first member secured to said valve base;
a second member displaceable along said first member;
a third member pivotally connected to said second member and secured to said valve seal plate; and
a biasing member engagaing said second member and exerting a biasing force to urge said valve seal plate toward said closed position; and
wherein said first member is a housing defining a passageway; and
wherein said second member is a piston block slidably displaceable along said passageway.

15. The safety relief valve assembly of claim 14, wherein said third member is pivotally connected to said piston member by a pin, said housing defining a slotted opening extending therethrough, said pin being displaceable along said slotted opening to limit displacement of said piston block along said passageway within a predetermined range of displacement.

16. The safety relief valve assembly of claim 14, further comprising a spring tension adjusting mechanism, including:
a stationary plate secured to said housing;
a movable plate positioned within said passageway, said spring being disposed between said movable plate and said piston block; and
a threaded fastener engaged between said stationary plate and said movable plate, said threaded fastener threadingly engaging one of said stationary and movable plates to displace said movable plate along said passageway to adjust the tension in said spring.

17. The safety relief valve assembly of claim 16, wherein said movable plate and said piston block each include a spring retaining portion.

18. A safety relief valve assembly, comprising:
a valve base;
a valve seal plate; and
a hinge mechanism pivotally coupling said valve seal plate to said valve base to allow pivotal movement of said valve seal plate between a closed position and an open position, including:
a first member secured to said valve base;
a second member displaceable along said first member and configured to provide a pivotal connection between said valve seal plate and said valve base; and
a biasing member engaging said second member and exerting a biasing force to urge said valve seal plate toward said closed position, said biasing force being adjustable.

19. The safety relief valve assembly of claim 18, further comprising an elongate member pivotally coupled to said valve base; and
a support member extending from said valve seal plate at a location generally opposite said hinge mechanism, said elongate member engaging said support member during said pivotal movement to urge said valve seal plate toward said closed position.

20. The safety relief valve assembly of claim 18, wherein said second member is pivotally connected to said valve seal plate by a pivot pin.

21. The safety relief valve assembly of claim 18, wherein said first member is a housing defining a passageway; and
wherein said second member is a piston block slidably displaceable along said passageway.

22. The safety relief valve assembly of claim 21, wherein said second member is pivotally connected to said valve seal plate by a pivot pin, said housing defining a slotted opening extending therethrough, said pin being displaceable along said slotted opening to limit displacement of said piston block along said passageway within a predetermined range of displacement.

23. The safety relief valve assembly of claim 21, further comprising a spring tension adjusting mechanism, including:
a stationary plate secured to said housing;
a movable plate positioned within said passageway, said spring being disposed between said movable plate and said piston block; and
a threaded fastener engaged between said stationary plate and said movable plate, said threaded fastener threadingly engaging one of said stationary and movable plates to displace said movable plate along said passageway to adjust the tension in said spring.

24. A safety relief valve assembly, comprising:
a valve base;
a valve seal plate; and
a hinge mechanism pivotally coupling said valve seal plate to said valve base to allow pivotal movement of said valve seal plate between a closed position and an open position, including:
a first member secured to said valve base;
a second member displaceable along said first member and configured to provide a pivotal connection between said valve seal plate and said valve base; and
a biasing member engaging said second member and exerting a biasing force to urge said valve seal plate toward said closed position;
an elongate member pivotally coupled to said valve base; and a support member extending from said valve seal plate at a location generally opposite said hinge mechanism, said elongate member engaging said support member during said pivotal movement to urge said valve seal plate toward said closed position.

* * * * *